MULTIVIBRATORS EMPLOYING TRANSISTORS OF OPPOSITE CONDUCTIVITY TYPES

Filed April 15, 1966

INVENTOR.
A. KARL RAPP
BY John V. Regan
Attorney

United States Patent Office 3,509,379
Patented Apr. 28, 1970

3,509,379

MULTIVIBRATORS EMPLOYING TRANSISTORS OF OPPOSITE CONDUCTIVITY TYPES

Adolph Karl Rapp, Princeton, N.J., assignor to RCA Corporation, a corporation of Delaware Filed Apr. 15, 1966, Ser. No. 542,911
Int. Cl. H03k *3/10, 3/284*
U.S. Cl. 307—279 17 Claims

ABSTRACT OF THE DISCLOSURE

The distributed capacitance of a portion of a multivibrator circuit is charged through a resistance means and normally closed first switch. A normally open second switch is connected across the capacitance. When the first switch is momentarily opened concurrently with the momentary closing of the second switch, the capacitor discharges through the second switch. A feedback circuit opens a third switch across the resistance means when the capacitor discharges to less than a given value and closes the third switch when, during the next charging cycle, the capacitor again charges to said given value. The effect is to steepen the leading and lagging edges of the pulse produced across the capacitance. The switches, resistance means and feedback circuit are preferably all field effect transistors.

This invention relates to multivibrators and, in particular, to monostable and astable multivibrators which employ transistors of opposite conductivity types and which lend themselves readily to manufacture in integrated form.

Two circuits which find wide use in electronic systems are the monostable and astable multivibrators. A monostable multivibrator, or one-shot, may be defined as a circuit having one stable operating condition and one semi-stable condition, characterized in that an applied input or trigger signal drives the circuit into the semi-stable condition, where it remains for a predetermined time before returning to the stable condition. Such a circuit is useful for pulse stretching, for producing an output pulse of predetermined duration, for signal delay, etc. An astable circuit, or free running multivibrator, is a circuit that has two semi-stable states and switches back and forth from one state to the other without external pulsing or triggering. An oscillator is one use of an astable multivibrator.

In recent times, great effort has been expended in manufacturing circuits in integrated form. A system comprising integrated circuits is smaller in physical size than one in which the circuits comprise discrete elements. Theoretically, integrated circuits can be made more cheaply than discrete component circuits. In order to realize the full benefits of integration, the circuits should be ones which have very low power dissipation, especially in the steady state condition. Also, the number of different types of circuit components should be minimized, since the number of processing steps, masks, etc., depends to a large extent on the number of different types of circuit components employed, and the cost of an integrated circuit is dependent upon the number of processing steps and masks required.

Accordingly, it is an object of this invention to provide new and improved monostable and astable multivibrator circuits.

It is another object of this invention to provide improved multivibrator circuits which employ transistors of opposite conductivity type, whereby power dissipation may be held to a low value.

It is still another object of this invention to provide improved monostable and astable multivibrators which may be constructed entirely of transistors.

It is a further object of this invention to provide improved monostable and astable circuits which comprise insulated-gate field-effect transistors and which may be readily integrated.

A monostable circuit embodying the invention comprises first and second transistors of one conductivity type and third, fourth and fifth transistors of the opposite conductivity type. The first and third transistors are connected in series with each other and with the parallel combination of a resistance means and the fifth transistor. The resistance means could be a sixth transistor of the opposite conductivity type. The second and fourth transistors are connected in series in a second circuit branch, with the junction of these transistors being connected to a load and to the control electrode of the fifth transistor. Input trigger signals are applied in common to the control electrodes of the first and third transistors, and the output of the first transistor is applied in common to the gates of the second and fourth transistors.

The astable circuit is similar to the monostable circuit except for the input to the first and second transistors. In the astable circuit, a third circuit branch is connected in parallel with the first and second branches and includes a seventh transistor of the one conductivity type and eighth and ninth transistors of the opposite conductivity type connected in series. A tenth transistor of the opposite conductivity type is connected in parallel with the ninth transistor and has its input D.C. coupled to the output of the first transistor. The output of the seventh transistor is D.C. coupled to the inputs of the first and third transistors, and the output of the second transistor is D.C. coupled to the inputs of the seventh and eighth transistors. Voltage levels may be applied at the inputs of the sixth and ninth transistors to determine the durations of the two halves of the output signal.

In the accompanying drawings, like reference characters denote like components: and FIGURE 1 is a schematic diagram of a monostable circuit embodying the invention;

Figures 1, 2, 3, 4, 5:
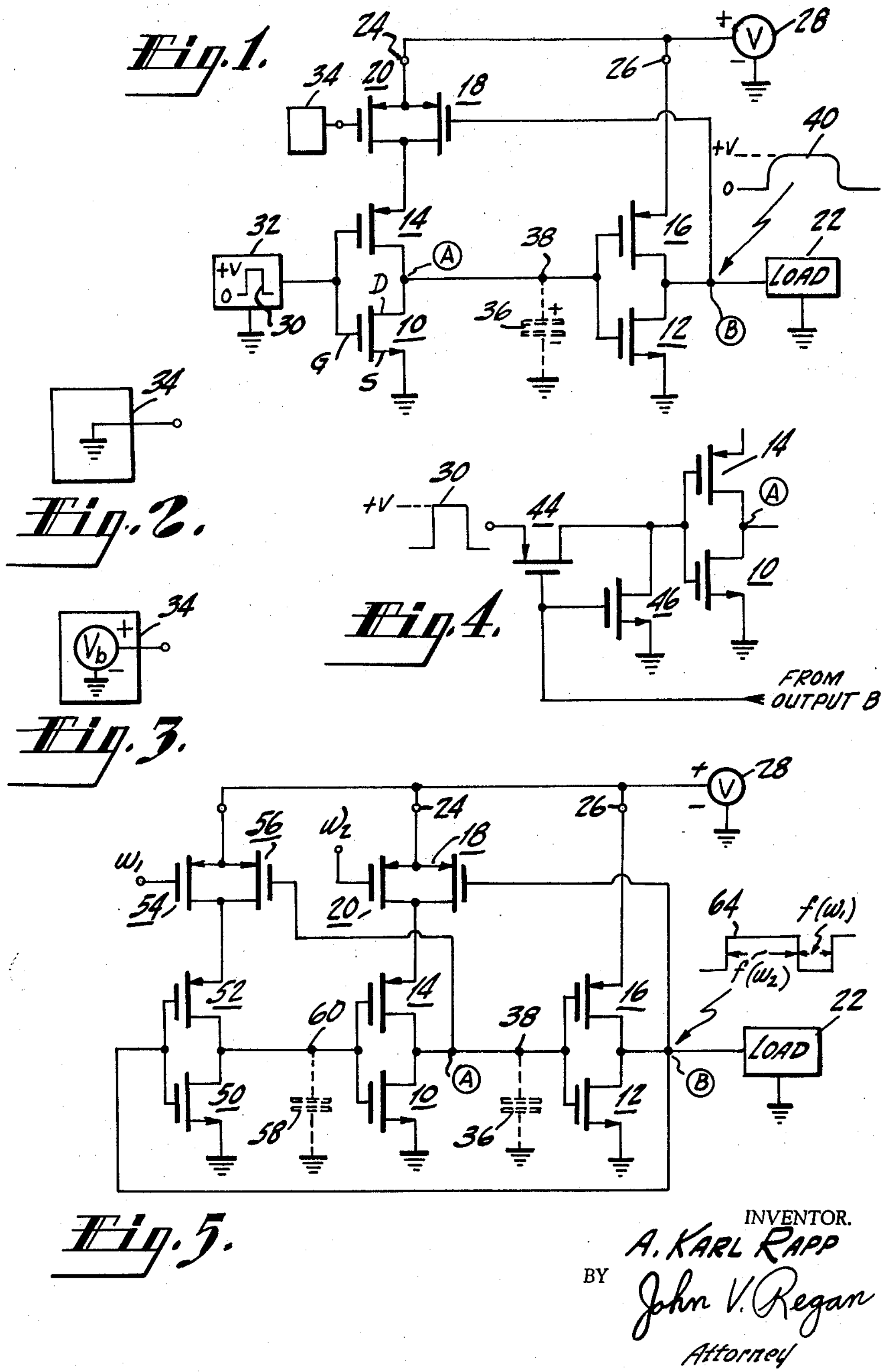
FIGURES 2 and 3 illustrate different biasing arrangements for the first time constant determining transistor in the FIGURE 1 circuit.
FIGURE 4 illustrates an input arrangement that may be used in the circuit of FIGURE 1.
FIGURE 5 is a schematic diagram of an astable circuit embodying the invention.

An insulated-gate field-effect transistor (IGFET) has characteristics which make such a device particularly suitable for use in the multivibrator circuits embodying the invention. Accordingly, the circuits are illustrated, by way of example, as employing such devices. An IGFET may be defined generally as a majority carrier field-effect device which includes a body of semiconductive material having a source and a drain thereon spaced from one another and defining the ends of a conduction path or channel through the body. A gate overlies a portion of the channel and is separated therefrom by an insulator. Since the gate is insulated from the semiconductor, it does not draw any current, or at least it draws no appreciable current, whereby the drain of one device may be connected by negligible impedance means to the gate of another device. Moreover, an IGFET may have a high gate or input capacitance which may serve the function of the timing capacitor in a multivibrator circuit.

Two types of IGFET's are the thin-film transistor (TFT) and the metal-oxide-semiconductor (MOS). The physical and operating characteristics of a TFT are described in an article, by Paul K. Weimer, entitled "The TFT—A New Thin Film Transistors," appearing at pages 1462–1469 of the June, 1962 issue of the Proceedings of the IRE. The MOS transistor and its characteristics are described in an article entitled "The Silicon Insulated-Gate Field-Effect Transistor," by S. R. Hofstein and F. P. Heiman, appearing at pages 1190–1202 of the September 1963 issue of the Proceedings of the IEEE.

The IGFET's to be used in the circuits of FIGURES 1, 4 and 5 are of the so-called enhancement type. Only a very small leakage current flows between the source and drain of an enhancement type IGFET when the voltages at the gate and source have the same value. Current flows between source and drain when the voltage at the gate is changed in a negative direction for a P-type transistor, or in a positive direction for an N-type transistor, after the gate-source threshold value is exceeded.

The monostable circuit illustrated in FIGURE 1 includes first and second N-type transistors 10 and 12 and third, fourth, fifth and sixth P-type transistors 14, 16, 18 and 20, respectively. Each transistor has a source and a drain defining the ends of a conduction path through the transistor, and a gate for controlling the impedance of the conduction path. The source, drain and gate of a common source IGFET correspond to the emitter (input), collector (output) and base (control), respectively, of a common emitter, bipolar transistor. Referring particularly to transistor 10, the source S is distinguished by an arrowhead thereon poled in the direction of conventional current flow. The drain D lead is shown parallel to the source S lead and appears on the same side of the transistor. The gate G lead projects from the opposite side of the transistor. The same convention is employed for each of the other transistors.

Transistors 10, 14 and 20 have their conduction paths serially connected, in that order, between circuit ground and a first circuit point 24, the drains of first transistor 10 and third transistor 14 being connected in common, and the source of third transistor 14 and the drain of sixth transistor 20 being connected in common. A second circuit branch comprises the conduction paths of the second and fourth transistors 12 and 16 serially connected, in that order, between circuit ground and a second circuit point 26, the drains of the transistors 12 and 16 being connected in common with each other and with the gate of the fitfh transistor 18. Transistor 18 has its conduction path in parallel with that of the sixth transistor 20. The gates of transistors 12 and 16 are connected directly in common and by a direct current (D.C.) connection to the drains of the first and third transistors 10 and 14. A voltage source 28 may have its negative terminal grounded and its positive terminal connected to the circuit points 24 and 26 for supplying operating potential to the circuit.

Input trigger signals 30 from a source 32 are applied in common to the gates of the first and third transistors 10 and 14. These trigger signals are positive going signals which may have an amplitude V equal to the potential provided by the bias source 28. An output load 22 is connected in common to the drains of the second and fourth transistors 12 and 16.

Sixth transistor 20 serves the function of a resistor in the timing network of the circuit and, for this reason, the transistor 20 could be replaced by a resistor. The use of a transistor 20, however, renders the overall circuit more easily integratable, since the entire circuit may consist entirely of transistors. The gate of transistor 20 is connected to a box 34, the contents of which may take the form illustrated in either of FIGURES 2 and 3. In FIGURE 2, for example, the gate of transistor 20 is grounded directly. In FIGURE 3, the gate is connected to a source of positive voltage $V_b$. The conductivity of the conducting channel in transistor 20, i.e., the resistance thereof, is a function of the voltage applied at the gate, and any value of resistance within reasonable limits may be achieved by proper selection of the voltage applied at the gate of this transistor.

As mentioned previously, an IGFET, especially an MOS transistor, has a relatively high input or gate capacitance, which capacitance may function as the time constant determining capacitance in the circuit. The combined input capacitances of the second and fourth transistors 12 and 16 together with the output capacitances of the first and third transistors 10 and 14 and stray capacitance in the interconnecting lead is represented in the drawing by the dashed capacitor 36. This capacitance has been found to be of sufficient magnitude for the generation of pulses of moderate duration. If very long duration pulses are desired, external capacitance may be connected between the point 38 and ground, in which case the dashed capacitor 36 may be considered to include this externally connected capacitance.

Consider now the operation of the circuit in the quiescent condition. With no trigger pulse 30 applied, the ground potential at the input baises first transistor 10 in the high impedance, off condition and biases third transistor 14 in the low impedance condition (transistor 14 is switched on and is closed and transistor 10 is switched off and is open). Transistors 14 and 20 then provide a conduction path between bias source 28 and point A, whereby the capacitance 36 is charged approximately to the full valve V supplied by the source 28. With a charge of V volts on the capacitor 36, in the polarity direction indicated, transistor 12 is biased in a low impedance condition and transistor 16 is biased off (transistor 12 is switched on and is closed and transistor 16 is switched off and is open). The output voltage at point B then is approximately ground potential, which biases fifth transistor 18 in the low impedance condition (the fifth transistor 18 is switched on and is closed).

When a positive going trigger pulse 30 is applied at the input, third transistor 14 turns off and first transistor 10 is biased on. Transistor 10 provides a low impedance path for rapidly discharging the capacitance 36 and driving point A to ground potential. Second transistor 12 then turns off and fourth transistor 16 turns on, whereupon the output voltage rises to +V volts (waveform 40). This output voltage biases fifth transistor 18 in a nonconducting condition.

At the termination of the trigger pulse, first transistor 10 turns off and third transistor 14 is biased on. Capacitance 36 then charges through the path comprising the conducting channels of third transistor 14 and sixth transistor 20. As mentioned previoulsy, transistor 20 may be biased to provide a relatively high impedance path. Also, this transistor 20 may have the dimensions of its sources and drain so selected, as compared to the dimensions of the sources and drains of the other transistors, as to have a much lower conductance, e.g., 1/20 that of the other transistors. Other techniques for achieving this result also are possible. Thus, capacitance 36 does not charge immediately to +V volts, but charges at a rate determined by the resistance provided by transistor 20 and the capacitance of capacitor 36.

When the charge on capacitance 36 reaches a value which exceeds the switching thresholds of the transistors 12 and 16, transistor 12 begins turning on and transistor 16 begins turning off. The output voltage at point B then begins to fall. This voltage, when applied at the gate of fifth transistor 18, biases transistor 18 into conduction. Since the conduction channel of transistor 18 is in parallel with that of transistor 20, the effect of turning on transistor 18 is to reduce the resistance in the charge path of the capacitance, producing a more rapid charge of the capacitance 36. The action is regenerative and results in the rapid turning on of second transistor 12 to produce a fairly sharp trailing edge in the output waveform 40.

If a resistor is used instead of the transistor 20, capacitance 36 charges linearly during that portion of the charge period when third transistor 14 is operating in the current saturation region, i.e. when $|V_{DS}| \geqq |V_{GS}| - V_T$, where $V_{DS}$=voltage between drain and source, $V_{GS}$=voltage from gate to source, $V_T$=the transistor's threshold voltage. When $|V_{DS}|$ becomes less than the value aforementioned, the operating point moves down to the nonlinear region of the operating characteristic, and the charging of capacitance 36 no longer is linear.

If a transistor 20 with grounded gate (FIGURE 2) is employed, the capacitance 36 charges linearly so long as either of transistors 14 and 20 is operating in the current saturation region. However, if the gate of transistor 20 is connected to a positive potential, the linear charge period is lengthened. This may be seen from the fact that $V_{GS}$ now has a smaller value. In practice, the bias voltage $V_b$ may have such a value that charging of capacitance 36 is linear from zero volts up to the value of voltage at which second transistor 12 becomes conducting. Threshold crossing of transistor 12 then is susceptible of better control.

In operation as just described, the width of the output pulse 40 is dependent to some extent on the width of the trigger pulse 30. This dependence results from the fact that the capacitance 36 does not begin to charge until the trigger pulse 30 terminates and transisor 14 is turned on. This dependence can be eliminated by modifying the circuit in the manner illustrated in FIGURE 4. As shown there, trigger pulse 30 is applied at the source of a P-type transistor 44, the drain of which is connected in common to the gates of the first and third transistors 10 and 14. An N-type transistor 46 has its conduction path connected between circuit ground and the gates of transistors 10 and 14. The gates of the additional transistors 44 and 46 are connected together and, by way of a D.C. conduction path, to the output point B (the drains of transistors 12 and 16, FIGURE 1).

In the modified circuit, the gates of transistors 44 and 46 are normally at ground potential. A trigger pulse 30 turns on transistor 44 and, in turn, turns on first transistor 10 to discharge the capacitance 36. Fourth transistor 16 (FIGURE 1) then turns on, and the output voltage at point B rises to +V volts. This voltage, applied at the gates of transistors 44 and 46, turns off transistor 44 to block the input pulse, and turns on transistor 46 to discharge any input capacitance and lower the voltage at the gates of transistors 10 and 14 to ground potential. Thus, the input trigger pulse 30 is only applied to transistors 10 and 14 for a very short period of time, irrespective of the width of this pulse.

The astable circuit, illustrated in FIGURE 5, differs from the monostable circuit in the following respects. The input trigger source 32 is omitted and is replaced by a third circuit branch comprising a seventh transistor 50 of the one conductivity type (N-type) having its conduction channel in series with the conduction channels of eighth and ninth P-type transistors 52 and 54. A tenth transistor 56 of the P-type is connected in parallel with ninth transistor 54, and has its gate D.C. connected to the drain of the first transistor 10. The drains of transistors 50 and 52 are connected in common to each other and to the gates of the first and third transistors 10 and 14. The gates of transistors 50 and 52 are connected in common and D.C. connected to the output point B at the drain of transistor 12. Dashed capacitor 58 represents the input capacitance at the gates of transistors 10 and 14, the output capacitances of transistors 50 and 52 and any stray capacitance in the interconnection. Alternatively, this capacitance 58 may include an external capacitance connected between point 60 and ground.

As in the monostable circuit, transistor 20 serves the function of a time constant determining resistor. The same is true for the ninth transistor 54. Voltages having values $W_1$ and $W_2$ may be applied at the gates of transistors 54 and 20, respectively, to fix the resistances provided by the conduction paths of these transistors and thereby determine the widths or durations of the separate halves of an output wave cycle. As in the monostable circuit, charging of capacitance 36 is linear throughout the charge period for certain values of $W_2$. The same is true for the combination of capacitance 58 and $W_1$.

Consider now the operation of the astable circuit and assume that initially the voltage at point B has a value of +V volts. Seventh transistor 50 then is biased on and eighth transistor 52 is biased off. Capacitance 58 is discharged and the voltage at point 60 is at ground potential, biasing first transistor 10 off and biasing third transistor 14 on. Because the output voltage at point B is high at this time, fifth transistor 18 is biased off, and capacitance 36 must charge through the series conduction paths of third transistor 14 and sixth transistor 20. The charge period is determined by the impedance presented by sixth transistor 20 which, in turn, is determined by the value of the voltage $W_2$ applied at the gate thereof and by the natural conductance of the transistor.

When capacitance 36 has charged sufficiently to raise the voltage at point 38 to the threshold value of second transistor 12, transistor 12 begins to conduct. More accurately, when the voltage at point 38 reaches the transition region of the voltage transfer curve for the transistor pair 12, 16, the voltage at output point B begins to fall. This voltage, applied to the gate of fifth transistor 18, begins to turn transistor 18 on and thereby reduces the resistance of the charge path for capacitance 36. As in the case of the monostable circuit, this action is regenerative, i.e., transistor 18 turning on causes capacitance 36 to charge more rapidly, which causes transistor 12 to turn on more rapidly, which causes the output voltage at point B to fall more rapidly and thereby drives transistor 18 into fuller conduction more rapidly.

When the voltage at output point B falls sufficiently close to ground potential, seventh transistor 50 turns off and eighth transistor 52 turns on. Capacitance 58, which is uncharged at this time, now begins to charge through the conduction paths of eighth transistor 52 and ninth transistor 54. Tenth transistor 56 is biased off at this time by the high voltage at point A. The resistance of this charge path is a function of the value of voltage $W_1$ applied at the gate of ninth transistor 54 and the natural conductivity of the transistor. As in the case of sixth transistor 20, this transistor 54 may have the dimensions of its source and drain selected so that the conductivity of this transistor is much lower than that of the other transistors, except transistor 20.

When the charge on capacitance 58 has reached the value to raise the voltage at point 60 above the turn on threshold of first transistor 10, the voltage at point A begins to fall which, in turn, begins to turn on tenth transistor 56 to reduce the impedance of the charge path. This action also is regenerative, whereby capacitance 58 now charges more rapidly and drives the voltage at point A rapidly to ground potential. Capacitance 36 now discharges rapidly to ground potential and starts a new cycle of operation similar to that just described.

The duration of the positive portion of an output waveform 64 is a function of the value of the voltage $W_2$ applied at the gate of sixth transistor 20. The duration of the negative portion of the output waveform is a function of the voltage $W_1$ applied at the gate of ninth transistor 54. These two portions of an output signal may be independently controlled by adjusting these voltage values.

Although the drains of the first and third transistors 10 and 14 are shown connected together in FIGURES 1, 4 and 5, it should be understood that transistor 14 could be connected between circuit point 24 and the transistors 18 and 20. In that event, the drains of transistors 18 and 20 would be connected to the drain of first transistor 10. The physical location of eighth transistor 52 could be changed in a similar manner in its branch circuit (FIGURE 5). Also all of the transistors could be of the opposite type to that illustrated, provided that the connections to the bias source 28 were reversed, and provided further that the polarity and levels of the input were changed in FIGURES 1 and 4.

What is claimed is:

1. The combination comprising:

first and second transistors of a first conductivity type and third, fourth and fifth transistors of a second, opposite conductivity type, each transistor having input and output means defining a conduction path through the transistor and a control means;

a resistance means;

a reference point and first and second other circuit points;

a first circuit branch comprising the conduction path of the first transistor, the conduction path of the third transistor and the resistance means connected in series between the reference point and the first circuit point, the input means of the first transistor being connected to the reference point;

means connecting the conduction path of the fifth transistor across said resistance means;

a second circuit branch comprising the conduction path of the second transistor and the conduction path of the fourth transistor connected in series, in that order, between the reference point and the second circuit point;

means connecting the control means of the second and fourth transistors to the output means of the first transistor; and a direct current connection between the control means of the fifth transistor and the output means of the second transistor.

2. The combination as claimed in claim 1, including means for applying an input signal in common to the control means of the first and third transistors and an output load connected at the output means of the second transistor.

3. The combination as claimed in claim 1, including means for connecting a source of operating potential across the first and second circuit branches; and means for applying an input signal in common to the control means of the first and third transistors.

4. The combination as claimed in claim 1, wherein said resistance means is the conduction path of a sixth transistor of said second conductivity type, wherein each of the transistors is an insulated-gate field-effect transistor having a source, a drain and a gate, and wherein said input means, output means and control means of a transistor are its source, drain and gate, respectively.

5. The combination as claimed in claim 4, including: a seventh transistor of said second conductivity type having its conduction path connected between an input terminal and a point common to the gates of the first and third transistors; and eighth transistor of said first conductivity type having its conduction path connected between the reference point and a point common to the gates of the first and third transistors; and means connecting the gates of the seventh and eighth transistors together and to the drain of the second transistor.

6. The combination as claimed in claim 4, including a capacitor connected between said reference point and a point common to the gates of the second and fourth transistors.

7. The combination as claimed in claim 4, including: a third circuit point; a seventh insulated-gate field-effect transistor of said one conductivity type and eighth, ninth and tenth insulated-gate field-effect transistors of said second conductivity type; a third circuit branch comprising the conduction paths of the seventh, eighth and ninth transistors connected in series, between the reference point and the third circuit point, with the source of the seventh transistor connected to said reference point; means connecting the conduction path of the tenth transistor in parallel with the conduction path of the ninth transistor; a direct current connection between the gate of the tenth transistor and the drain of the first transistor; and a direct current connection between the drain of the second transistor and a point common to the gates of the seventh and eighth transistors.

8. The combination as claimed in claim 7, including means for connecting the gates of the sixth and ninth transistors to points of fixed potential, and output means connected at the drain of the second transistor.

9. The combination as claimed in claim 8, including means for applying operating potential across each of the first, second and third circuit branches.

10. The combination as claimed in claim 8, including first capacitance means between the gate and source of the first transistor, and second capacitance means between the gate and source of the second transistor.

11. The combination comprising:

first and second terminals;

charge storage means;

a charging circuit including a resistance means, and means coupling said resistance means in series with said charge storage means across said terminals;

a first switching device connected across said resistance means;

a discharge circuit comprising a second switching device connected across said charge storage means; and feedback circuit means comprising means responsive to a voltage across said charge storage means for opening said first switching device when said storage means is discharged and for closing said first switching device when the accumulation of charge on said storage means results in a voltage greater than a given value.

12. The combination as claimed in claim 11, wherein said coupling means comprises a third switching device and further including means for closing said second switching device to permit said storage means to discharge and then closing said third switching device to permit said charge storage means to accumulate charge.

13. The combination as claimed in claim 12, wherein said charge storage means is a capacitance means.

14. The combination as claimed in claim 12, wherein said feedback circuit means includes a fourth switching device and a fifth switching device connected in series across said terminals; said fourth switching device being closed when said capacitance means is discharged causing said first switching device to open, and said fifth siwtching device being closed when said capacitance means is charged to a voltage of greater than a given value causing said first switching device to close.

15. The combination as claimed in claim 14, wherein the first, second, third, fourth and fifth switching devices are first, second, third, fourth and fifth insulated-gate field-effect transistors, respectively, each having a control electrode and drain and source electrodes defining the ends of a conduction path.

16. The combination as claimed in claim 15, wherein said first, third and fourth transistors are of one conductivity type and said third and fifth transistors are of opposite conductivity type.

17. The combination as claimed in claim 16, wherein the drain electrodes of said fourth and fifth transistors are direct current connected together and to the control electrode of said first transistor; wherein the source electrodes of said first and fourth transistors and one end of said resistance means are connected in common to one of said terminals and the source electrodes of said second and fifth transistors are connected to the other one of said terminals; wherein the control electrodes of said fourth and fifth transistors are coupled to the drain electrodes of said second and third transistors; and wherein the source eletcrode of said transistor is connected to the other end of said resistance means and to the drain electrode of said first transistor.

(References on following page)

References Cited

UNITED STATES PATENTS

| | | | |
|---|---|---|---|
| 3,114,049 | 12/1963 | Blair | 307—288 |
| 3,231,761 | 1/1966 | Keller et al. | 307—273 |
| 3,267,295 | 8/1966 | Zuk | 307—279 |
| 3,268,738 | 8/1966 | Deavenport | 307—273 |

JOHN S. HEYMAN, Primary Examiner

H. A. DIXON, Assistant Examiner

U.S. Cl. X.R.

307—272, 288